(12) United States Patent (10) Patent No.: US 8,718,619 B2
Lidström et al. (45) Date of Patent: May 6, 2014

(54) PREDICTING PRESENCE OF A MOBILE USER EQUIPMENT

(75) Inventors: Mattias Lidström, Stockholm (SE); Joakim Formo, Akersberga (SE); Hjalmar Olsson, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 601 days.

(21) Appl. No.: 12/768,951

(22) Filed: Apr. 28, 2010

(65) Prior Publication Data

US 2010/0279708 A1 Nov. 4, 2010

(30) Foreign Application Priority Data

Apr. 28, 2009 (SE) .............................. SE2009/050456

(51) Int. Cl.
*H04W 24/00* (2009.01)
(52) U.S. Cl.
USPC ..................................... 455/414.2; 455/456.1
(58) Field of Classification Search
USPC .................. 455/414.2, 456.1; 342/357.4, 369
See application file for complete search history.

(56) References Cited

U.S. PATENT DOCUMENTS

| | | | |
|---|---|---|---|
| 2004/0017310 A1* | 1/2004 | Vargas-Hurlston et al. | 342/357.1 |
| 2004/0192299 A1 | 9/2004 | Wilson et al. | |
| 2009/0054043 A1* | 2/2009 | Hamilton et al. | 455/414.2 |

FOREIGN PATENT DOCUMENTS

| | | |
|---|---|---|
| EP | 1176840 A1 | 1/2002 |
| EP | 1 355 283 A1 | 10/2003 |
| EP | 1542430 A1 | 6/2005 |
| EP | 1802145 A1 | 6/2007 |
| EP | 1 518 435 B1 | 2/2012 |
| JP | 2003309653 A | 10/2003 |
| JP | 2005530430 A | 10/2005 |
| JP | 2007124031 A | 5/2007 |
| JP | 200832563 A | 2/2008 |
| WO | 0072463 A2 | 11/2000 |
| WO | 2008066242 A1 | 6/2008 |

OTHER PUBLICATIONS

International Search Report and Written Opinion issued in International Application No. PCT/SE2009/050456 on Mar. 2, 2010, 19 pages.
Japanese Office Action issued in Japanese Patent Application No. 2010-102626 on Jan. 17, 2014, 4 pages.

* cited by examiner

*Primary Examiner* — Patrick Edouard
*Assistant Examiner* — Myron K Wyche
(74) *Attorney, Agent, or Firm* — Rothwell, Figg, Ernst & Manbeck, P.C.

(57) ABSTRACT

A method, system, user equipment and computer program for predicting presence of a mobile user equipment, that includes: determining a set of time-distributed locations of a number of mutually associated mobile user equipments; calculating an aggregated location as a function of a location distribution of the set of locations; for each mobile user equipment, predicting a probability that the mobile user equipment will be present at the aggregated location at a future time; and initiating sending, to any of the mobile user equipments, a message indicating that another mobile user equipment of the mobile user equipments is predicted to be present at the aggregated location at a specific future time.

20 Claims, 5 Drawing Sheets

PREDICTING PRESENCE OF A MOBILE USER EQUIPMENT

TECHNICAL FIELD

The invention relates to a method, base station, user equipment and computer program for predicting presence of a mobile user equipment, taking an association with other mobile user equipments into account when predicting the presence.

BACKGROUND ART

Today users of user equipments (UEs) like cellular phones, PDA's (personal digital assistants), wireless broadband connected computers and user of other electronic equipment capable of wireless mobile communication have limited possibility of efficiently predicting face-to-face encounters with friends at a present or future location, based on their friends' patterns of actual movements and locations.

By using existing systems a user of a UE can share presence (physical location) information and to certain degree information about future presence, based on calendar events or direct manual input from the user. However, existing systems are often not optimized for performing automated estimates of the likeliness of near future presence of friends at the user's current or future location based on a shared record of actual presence and movements over time and space.

An example of a known technique that relates to predicting a future location of a mobile node is described in US 2009/054043 A1. In this document a computer-implemented method includes determining a current location of a first mobile node, determining a location of at least a second mobile node wherein the second mobile node is associated with the first mobile node via a social network, and generating a list including at least one candidate destination determined, at least in part, according to the location of the first mobile node and the location of the second mobile node. For each candidate destination on the list, a probability that the first mobile node is in route to that candidate destination location can be calculated. A candidate destination can be selected, according to the probabilities, from the list as a predicted future location of the first mobile node. The predicted future location of the first mobile node can be output.

Though the known method described above may predict a future location of a mobile node, it is limited to use of movements for individual mobile nodes when predicting a future location, which provides a limitation when predicting face-to-face encounters with a number of friends using a respective mobile user equipment.

Accordingly, the applicant has appreciated that there is a need of improvement in terms predicting of a presence of a mobile user equipment.

SUMMARY

In view of the foregoing, it is an object of the invention to provide an improvement of the above techniques and prior art. More particularly, it is an object to provide a method for more accurately predicting a location of a number (more than one) of user equipments, as well as providing usable navigation information to a user allowing him to efficiently navigate to the predicted location.

Hence a method of predicting presence of a mobile user equipment is provided. The method is performed on a computer system and comprises the steps of: determining a set of time-distributed locations of a number of mutually associated mobile user equipments; calculating a point of interest as a function of a location distribution of the set of locations; for each mobile user equipment, predicting a probability that the mobile user equipment will be present at the point of interest at a future time; and initiating sending, to any of the mobile user equipments, a message indicating that another mobile user equipment of the mobile user equipments is predicted to be present at the point of interest at a specific future time. The point of interest can here be referred to as an "aggregated location".

The inventive method is advantageous in that it may enable a user of the user equipment to make qualified decisions if he should visit or stay at a specific location, based on information about predicted presence of friends and others using respective user equipments. Another advantage lies in privacy, as the method does not require identification of the user, e.g. when a user equipment is associated with an anonymous identification parameter. Moreover, if it is desirable to reduce the risk of meeting a certain individual or certain types of persons (e.g. according to preferred hobbies) at a certain time, the inventive method may support such an effort.

The computer system refers to one or more computers that comprises at least one processing unit. Also, time-distributed locations refer to a set of data indicating a number of physical (geographic) locations at a certain, respective time, i.e. the time-distributed locations comprise a number of location-time pairs.

A point of interest, i.e. an aggregated location, may be any physical location where people can meet and is typically a location where people for various reasons are present at a certain time of the day, week, month or year. Examples of points of interest can be a bar, a night club, a monument, a certain beach or any other outdoor or indoor place where people prefer to meet or have agreed to meet. In addition, a point of interest may also be an event taking place at regular intervals, such as the Stockholm Marathon, the Roskilde Festival in Denmark etc. The point of interest is a combination several locations of time-distributed locations of user equipments, which accordingly means that the point of interest is determined on basis of (i.e. as a function of) time-distributed locations of a number of user equipments. The association between the user equipments may, as elucidated below, be based on a connection via a social network service. A "time-distributed" location means that the location is given in combination with a time value, where the time value indicates when the location of the user equipment is valid. For example, the time-distributed location may be in the form of a geographical coordinate (e.g. in form of degrees: minutes: seconds) and a time (e.g. in form of year: month: day: hour: minute). Other data formats for indicating a location and time can be used. In a corresponding manner is the point of interest also time distributed.

A message indicating predicted presence of a mobile user equipment refers to any data transmission containing information about estimated location of the user equipment. In this context it should be understood that the presence of the mobile user equipment is often indicative of the presence (location) of the user generally carrying the user equipment.

It should be noted that "determining" a set of time-distributed locations of a number of mutually associated mobile user equipments may within the invention be interpreted as "receiving" the time-distributed locations from the user equipments, i.e. receipt of data is sufficient for determining time-distributed locations. Moreover, a "number of" user equipments here means "more than one" user equipment, but may typically mean "more than ten" user equipments.

The mutually associated mobile user equipments refer to a functional or social connection between the user equipments, i.e. the user equipments are somehow related. For example, the mobile user equipments may be associated with each other via a social network system. The social network system is basically a computer server which stores information about a social network which is a social structure made of nodes (which typically represent individuals) that are tied by one or more specific types of interdependency, such as values, physical proximity to others, financial exchange, friendship, kinship, interests, frequency of social contact, time spent in proximity with one another etc. Social networks can represent both a collection of ties between people and the strength of those ties. Accordingly, in this context the user equipments can be implemented as a respective node in the social network while their associations are implemented as ties between the nodes.

The social network system can also include software modules and functions for analyzing the network by performing various metric operations and for conveniently defining nodes and ties between the nodes. Examples of various operations on networks can be found in available social network analysis software, such as in iPoint, NetMiner, InFlow or in the open source package Social Networks Visualiser.

The method may comprise receiving at predefined time intervals time-distributed locations of a certain user equipment, which provides a possibility to plan the reporting of time-distributed locations such that the stress on the communication channel over which the time-distributed locations are reported is reduced. The predefined time intervals may be static or dynamic, such as constant for one or more user equipment, dependant of the time of the day etc. More specifically, the predefined time intervals may be determined as a function of a travelling speed of the certain user equipment, which has proven to be one of the best ways of reducing a load on the communication channel. One example of determining the time intervals as a function of a travelling speed includes setting a larger time interval if the travelling speed is low, and a relatively smaller time interval if the travelling speed is relatively higher.

The receiving of time-distributed locations may comprise receiving a transmission time value set at the certain user equipment sending the time-distributed locations. Such a transmission time value represents the time at which the time-distributed locations were sent from the user equipment. This means that the transmission time value is typically given by a time indicator in the user equipment which shows the local time (user equipment-time) of the transmission.

The transmission time value may be compared with a receiving time value, for evaluating a validity of the time-distributed locations received with the transmission time value. The receiving time value can be given by a time indicator of the computer system or by any other time indicator that provides a time value to the computer system. Evaluation of the validity typically comprises comparing the transmission time value with the receiving time value, such that any difference resulting from the comparison may be used to modify the time-distributed locations by changing their associated time value in accordance with the difference. This is done for e.g. assuring the actual location of a user equipment at an actual time that correlates to other user equipments, which is quite useful if several user equipments have different local time values (different or wrong settings of the local clock).

The method may comprise receiving from a user equipment a manual confirmation of a future presence at a point of interest, such that it is possible for a user to manually define a location of interest. Apart from defining the physical location of the point of interest, a time value may be defined as well, for purpose of indicating at what time the point of interest really is of "interest".

The method may comprise verifying an allowance setting received by a certain mobile user equipment before initiating the sending of any message indicating the predicted presence of the certain mobile user equipment. The allowance setting may, for example, be a rule (set by a person using the user equipment) that prevents sending a presence indicating message to another certain user equipment. The allowance setting can be uploaded to the computer system from the user equipment of the person who do not want to share his presence, and can be time dependant such that presence is shown or hidden only at certain time intervals. It is also possible to combine the allowance setting with a location such that presence is shown or hidden in dependence of the location of the point of interest, and/or combine the allowance setting with a person. Of course, verifying an allowance setting may give either a positive result (show presence) or a negative result (do not show presence).

The method may comprise omitting the initiate of the sending of any message indicating the predicted presence of the certain mobile user equipment, if the allowance setting fulfils a specific condition. An example of such a specific condition can be "do not show my predicted presence to person A if my presence, at the location X, occurs between 14.00 and 16.30.". "Omitting the initiate of the sending" means that the message is not sent to a user equipment fulfilling the allowance conditions. Of course, the allowance setting may be seen as a "denial setting", as it only is a matter of fulfilling a condition that prevents that a certain user equipment receives the message.

The method may comprise receiving from a mobile user equipment a point of interest, which allows a user or a group of users to create a point of interest on his/their own. Once this is done the computer system does not need to calculate a point of interest but may immediately collect time-distributed locations for the subsequent determining of the prediction of the probability that a mobile user equipment will be present at the point of interest at a future time. It is also possible for the computer system to receive manual (future) time and location data (point of interest) from a user equipment, such that a user may manually indicate his future presence. In this case the computer system may use a very high probability-value for the prediction that the mobile user equipment will be present at the point of interest at the future time. In a strict sense, receiving from a mobile user equipment a point of interest, such that a user may create a point of interest on his own, may in one embodiment render the calculation of the point of interest superfluous (at least for the received point of interest).

A point of interest may comprise a geographical coordinate. An address may be used as well or any other name symbolizing the point of interest. A point of interest may comprise a distance value defining an area of the point of interest, which provides a possibility to reduce the risk of location-interference if several points of interest are proximate. The distance value for defining the area of the point of interest may be a function of the set of time-distributed locations of the number of mobile user equipments.

The method may comprise the steps of: selecting a certain point of interest as a function of the probability of mobile user equipments being present at or proximate to the certain point of interest; and initiate sending to a mobile user equipment information associated with the certain point of interest.

The method may comprise the step of storing the point of interest. In other words, the method may produce a result in form of the point of interest which can be used in other situations, for example if a number of points of interests produced by the method is exported to other applications, such as to various navigation applications. The point of interest can typically be stored on a computer-readable memory.

The step of calculating the point of interest may comprise determining a mean value of the set of locations. In other words, the point of interest can be a mean value of the set of locations. In this context, a mean value may be a result produced by a combination of the set of locations, and typically reflects some property of each location of the set of locations. There are numerous ways of determining the point of interest as a mean value of the set of locations, for example by calculating an arithmetic, geometric, harmonic, generalized, weighted arithmetic or truncated mean, or any other value that reflects the set of locations. The combination (i.e. the point of interest) of the set of locations can typically be a result from a mathematical operation that takes the set of locations as input, and "determining a mean value of the set of locations" may include any mathematical operations that takes the set of locations as input for determining a location that aggregates the set of locations.

According to another aspect of the invention a computer system in a communications network is provided for predicting presence of a mobile user equipment. The computer system comprises: means for determining a set of time-distributed locations of a number of mutually associated mobile user equipments; means for calculating a point of interest as a function of a location distribution of the set of locations; means configured to, for each mobile user equipment, predict a probability that the mobile user equipment will be present at the point of interest at a future time; and means for initiating sending, to any of the mobile user equipments, a message indicating that another mobile user equipment of the mobile user equipments is predicted to be present at the point of interest at a specific future time. As previously mentioned, the computer system may comprise one or more computers and/or computer servers.

For the computer system, the mobile user equipments may be associated with each other via a social network system. The computer system may also comprise means for receiving at predefined time intervals time-distributed locations of a certain user equipment. These receiving means may be configured to receive a transmission time value set at the certain user equipment sending the time-distributed locations. The means for receiving may also be configured to receive from a user equipment a manual confirmation of a future presence at a point of interest, and/or receive a time value indicating at what time the point of interest really is of "interest".

The computer system may comprise means for comparing the transmission time value with a receiving time value.

The computer system may comprise means for verifying an allowance setting received by a certain mobile user equipment, before initiating the sending of any message indicating the predicted presence of the certain mobile user equipment. The computer system may also comprise means for omitting the initiate of the sending of any message indicating the predicted presence of the certain mobile user equipment, if the allowance setting fulfils a specific condition.

The above mentioned means for receiving may receive from a mobile user equipment a point of interest. It is also possible for the computer system to receive manual (future) time and location data from a user equipment.

The computer system may comprise: means for selecting a certain point of interest as a function of the probability of mobile user equipments being present at or proximate to the certain point of interest; and means for initiating sending to a mobile user equipment information associated with the certain point of interest.

According to a further aspect of the invention, a mobile user equipment is provided and configured to exchange predicted presences with a number of associated, corresponding mobile user equipments. The mobile user equipment comprises: radio transmission means for allowing a set of time-distributed locations of the mobile user equipment to be determined; receiver means configured to receive a message indicating that any of the associated mobile user equipment is predicted to be present at a point of interest at a specific future time, the point of interest being calculated as a function of a location distribution of the set of locations and a corresponding set of time-distributed locations of the number of associated mobile user equipments.

The radio transmission means may provide for determining a location of the user equipment, for example by triangulation, but may also include positioning means such as a GPS receiver for determining and sending location data and time-values for the location.

According to yet another aspect of the invention a computer program for predicting presence of a mobile user equipment is provided. The computer program comprises code means which when run on a computer system causes the computer system to: determine a set of time-distributed locations of a number of mutually associated mobile user equipments; calculate a point of interest as a function of a location distribution of the set of locations; for each mobile user equipment, predict a probability that the mobile user equipment will be present at the point of interest at a future time; and initiate sending, to any of the mobile user equipments, a message indicating that another mobile user equipment of the mobile user equipments is predicted to be present at the point of interest at a specific future time.

According to still another aspect of the invention a computer program product is provided, comprising a computer readable means and the above described computer program stored on the computer readable means.

The inventive computer system, user equipment and computer program may be configured/comprise means for implementing any of the features described above in association with the inventive method of the computer system, and shares the corresponding advantages.

BRIEF DESCRIPTION OF THE DRAWINGS

Embodiments of the invention will now be described, by way of example, with reference to the accompanying schematic drawings, in which.

DETAILED DESCRIPTION

Figure 1:
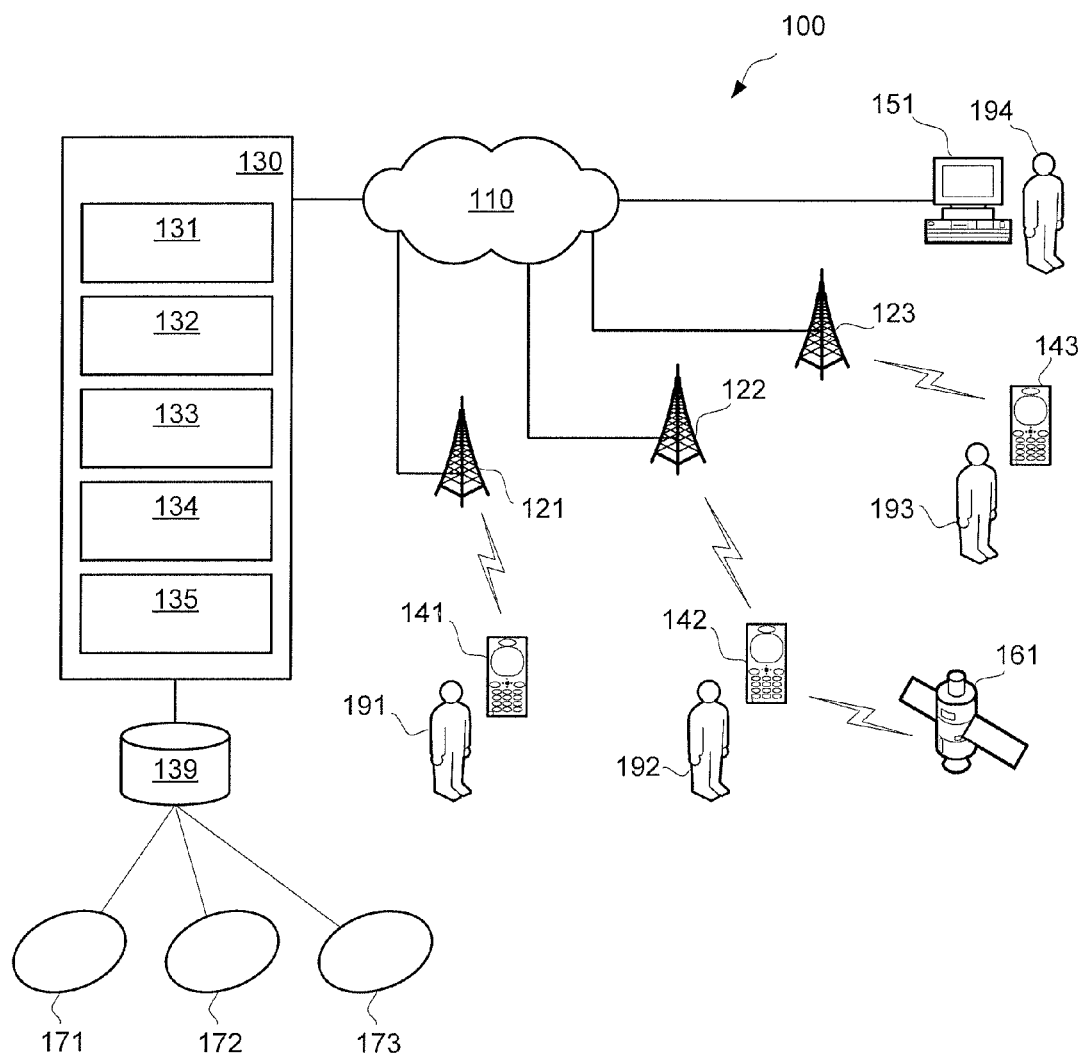
FIG. 1 illustrates a communication system implementing the invention according to an embodiment.

In general, the user equipments (UEs) for which future presence is to be predicted use known positioning technologies to extend current presence solutions (e.g. Open Mobile Alliance Presence and Group Management) in order to automatically and continuously collect data about the position of the user equipment (UE) together with information about date and time. In this manner time-distributed locations are collected. The positioning and data collection system is run on a UE for wireless communication and the collected time-distributed locations are sent to and stored in a common database in the computer system.

The computer system uses the collected time-distributed locations to interpret and define the users' regular geographical locations, the usual times when they are usually present at the location, for how long they normally stay, in what sequence the locations are most often visited and what routes are usually traveled between the locations. To avoid overloading a network over which the UE communicates with the data system the patterns of travel can be recorded on the UE and uploaded to the computer system daily or weekly as configured by the user or in dependency of a travelling speed of the UE.

After a period of time, when the computer system has collected enough data (time-distributed locations) to identify current presence at a regularly visited location, the accuracy of the computer system can be further improved and fine tuned as the system prompts manual user input such as place naming, categorizing, tagging and defining of point of interest boundaries. Increased accuracy can be obtained by accessing information in calendar events. This requires explicit group formation and active consent to hand out the information. For named groups this will allow users to predict where they can go in order to meet their friends.

When the system is able to identify travelling patterns from the collected data a method like the k-means clustering method described below is applied to the identified places, routes and schedules for predicting the user's future presence, such that the so called points of interests are created. Naturally, the longer the computer system collects data the more accurate the presence predictions will be.

Each user can via his UE connect to other users via their UEs and can create a personal group of other users with whom they have reciprocal permissions to access predicted presence, i.e. create a small social network. Each user in the group can search for predicted near future presence of other group members at their current location. The level of identity revelation can be set by each user, and the system can be usable with different degrees of intrusiveness. Users may also join more generic groups to find popular places to visit, and users may input queries such as "students at Stockholm University playing volleyball?". The answer can be an output indicating a point of interest (also referred to as an aggregated location) where the likelihood of meeting such people is high. This also allows businesses like coffee-shops, restaurants and bars to make offerings to such point of interests. In order to verify that the user is allowed to make queries or offerings of the mentioned kind, which includes verifying the identity of the user, the IP Multimedia Subsystem (IMS) can be used, which is an architectural framework for delivering internet protocol (IP) multimedia services as in accordance with the wireless standards body 3rd Generation Partnership Project (3GPP).

Another example of a query to the computer system can be "how likely is it that any user in my group will be at location Y within an hour?". The answer can then be related to the user's current location, and the answer could be presented as a relative value, textually or graphically. The answer could also indicate other specific times when the odds of having encounters with friends at that specific location are especially high. This can also be used to recommend to the user which point of interest should be visited in order to increase the likelihood of running into friends.

In an addition to a presence profile (presentity) the user can choose to report his presence for a given point of interest indicating that he will be present there for a given period of time. In a similar approach the system can be used to hide ones presence at such a point of interest and/or to warn a user when another member is approaching the point of interest. Such a warning message may e.g. state "in 10 minutes the likelihood of running into user A will be 85%" in the present location. It is also possible to utilize the information for other purposes such as advertisement. Also, by allowing users to create points of interest, popular places will be propagated throughout the communication system letting service providers and/or operators gain useful knowledge that can be leveraged to create better and more relevant service offerings. However, the main feature still concerns providing a user with information making it possible to navigate to a physical location were the likelihood of meeting certain people is relatively high.

With reference to FIG. 1 a communication system 100 with a computer system 130 for predicting presence of a mobile UE is illustrated. The computer system 130, which is further elucidated below, can (in terms of hardware and communication equipment) be implemented as a conventional operator server at a premises of an operator delivering services of the communication system 100. A database 139 is connected to the computer system 130 and stores information about a number of points of interest 171-173 and received time-distributed locations. The database 139 may be a ROM, RAM or flash memory or any other suitable memory or data storage media, such as a conventional hard drive.

The computer system 130 is connected to a network 110 which is implemented as, or include, for example a WAN (Wide Area Network), a LAN (Local Area Network), the Public Switched Telephone Network, the Internet, and one or more intranets. The communication network 110 can also include a wireless short or long range network such as a local wireless network built using Bluetooth or one of the IEEE 802 wireless communication protocols, Wi-Fi Protected Access, or a long range wireless network like a mobile, cellular, and or satellite-based wireless network, and support voice, video, text, and/or any combination thereof, e.g., a GSM (Global System for Mobile communications), TDMA (Time Division Multiple Access), CDMA (Code Division Multiple Access), W-CDMA (Wideband Code Division Multiple Access), and/or a network like the LTE (Long Term Evolution) network as specified by 3rd Generation Partnership Project (3GPP) Release 8.

A number of mobile base stations 121, 122, 123 are included in the communications system 100 to support wireless communication with a number of UEs 141, 142, 143. The base stations 121, 122, 123 can, in a manner known within the art, establish communication with the UEs 141, 142, 143, the network 110 and the computer system 130.

The base stations 121, 122, 123 are configured to support one or more of the above communication protocols, whether short or long range. For example, the base stations can be implemented as an 802.xx-type access point or as a mobile or cellular access point such as a conventional 3G base station or eNodeB of an LTE network. Various kinds of information processing systems like a personal computer 151 are also included and are communicatively connected (fixed or wireless) to the communications network 100. Users 191-194 associated with a respective UE 141-143 or information processing system 151 are illustrated proximate their respective equipment. Each of the equipments 141-143, 151 are associated with a respective identification data for being linked with its user. Each of the UEs 141-143 can be any portable communication device capable of establishing a wireless communication link with one of the base stations 121-123.

The UEs 141-143 can also receive data form a GPS (Global Positioning System) satellite 161 such that it is possible to determine a time dependant location of the respective UE. However, other conventional techniques for determining a location of a UE may be used as well, such as other positioning systems utilizing satellites and triangulation by means of the base stations 121-123.

Figure 2:
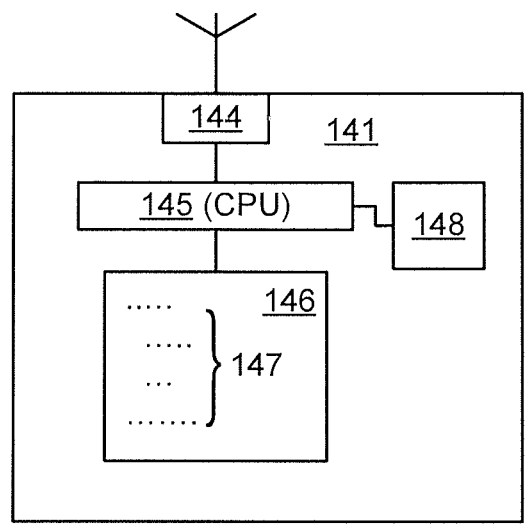
FIG. 2 illustrates a user equipment used in the communication system of FIG. 1.

With reference to FIG. 2 a UE like the UE 141 of FIG. 1 is illustrated in further detail and comprises a central processing unit 145 that is connected to and capable of controlling combined radio transmission means, and receiver means 144 for wireless communication with a base station like 121. A memory unit 146 is connected to the processing unit 145 and software instructions 147 for one or more software applications are stored on the memory unit 146. Here one of these software applications is an application that implements functionality for facilitating prediction of presence and resides on the central processing unit 145 when executed. Included in the UE 141 is also a positioning module like a GPS receiver 148 for allowing determining a position of the UE 141. However, as mentioned other positioning techniques may be used as well, rendering the specific GPS receiver 148 optional. The processing unit 145 can also, e.g. in a conventional manner by using data collected by the positioning module 148, determine a travelling speed of the UE 141 as well as extrapolating a velocity vector/movement direction of the UE 141.

As an option to using a GPS receiver, information about cell-ID (location associated with a base station the UE communicates with) may be used. To retrieve a current cell-ID and access cell-ID information (location), a Java ME application in e.g. SonyEricsson® from JP-7 and forward may be used, or the Nokia® S60 platform and UIQ. Another solution that may be used for retrieving time-distributed locations includes, as mentioned, triangulation which can be achieved by using e.g. the Ericsson MPS (Mobile Positioning System) product.

Dependent of technique for determining time-distributed locations, the UE 141 is configured to collect or provide signals to a base station like 141 for allowing collection of movement traces of the user 191 carrying the equipment 141. The traces comprise position and timestamp pairs and can as mentioned be recorded in different ways depending on the device used by the user. The traces may also comprise information about which method or technology (GPS, triangulation etc.) that was used for collecting the time-distributed locations. This provides a possibility to estimate the accuracy of the time-distributed locations which can be relevant as many position-determining systems have different accuracy.

Collected data like the time-distributed locations is sent to the computer system 130 for further processing. In case a time-distributed location is determined by the UE 141, this data is collected during a certain time before transmittal to the computer system 130 since it saves overhead both in terms of network traffic and power consumption. Examples of a time interval for collecting the time-distributed locations can be "every 3:rd second" if a UE travelling speed is above e.g. 50 km/h, or may be infinite as long as the UE is not moving.

A number of different protocols and/or frameworks can be used to handle the grouping of time-distributed locations and sending this data to the computer system 130, such as the OMA (Open Mobile Alliance) Presence SIMPLE (Session initiation protocol for Instant Messaging and Presence Leveraging Extensions) framework, or a REST-like (Representational State Transfer-like) web service. However, if a solution like triangulation for position tracking is chosen, such as Ericsson MPS, no transportation is needed as all time/location-information can be collected by the computer server 130 by means of the base stations 121-123.

Time synchronization is used since the time-distributed locations will, as described below, be processed together with time-distributed locations from other UEs and since a point of interest generally is time dependent. For this purpose, each UE sends a timestamp or transmission time (the UE clock time at the time of sending the time-distributed locations) and then the computer system 130 compares it to the receive time. The receive time is typically the clock time at the computer system 130 at the time of receiving the time-distributed locations. This means that the computer system comprises a clock or continuously receives time data from another system (not shown). The receive time can also be adjusted for an estimated transmission time. Comparing a transmission time with a receive time can also be seen as a verification of the incoming time-distributed locations, since time-distributed locations with faulty timestamps will be discovered and hence possibly disregarded.

Figure 3:
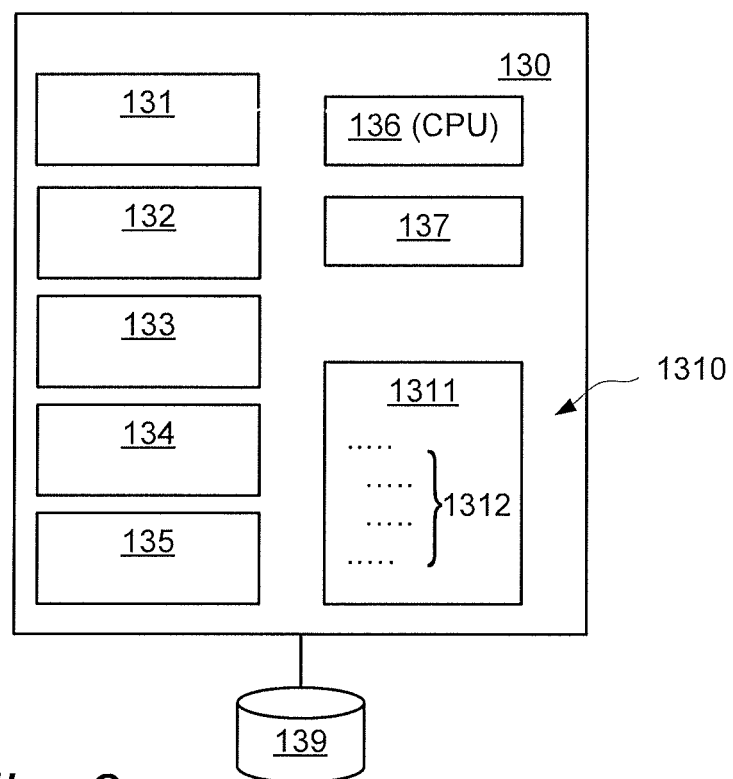
FIG. 3 illustrates a computer system used in the communication system of FIG. 1.

With reference to FIG. 3 a computer system like the computer system 130 of FIG. 1 is illustrated in more detail and comprises a central processing unit 136 connected to an interface and communications module 137 for communication over the network 100. The computer system 130 includes means 131 for calculating a point of interest, i.e. a point of interest calculation module 131, and includes means 133 configured to predict a probability that any of the mobile user equipments 141, 142, 143 will be present at the point of interest 171 at a future time, i.e. a presence prediction module 133. The computer system 130 also includes a messaging module 132 which can be referred to as means 132 for initiating sending of a message, such as a message concerning e.g. a UE's predicted presence at a certain time.

A UE position module 134 and a social networking module 135 are also comprised in the computer system 130. The UE position module 134 can be referred to as means 134 for determining a set of time-distributed locations of one or more UEs, and may include functionality for deriving a location of the UE by using triangulation, and/or by receiving from the UE data about time-distributed locations of the UE.

The social network module 135 implements general functionality for identifying, representing, analyzing and simulating nodes (user equipments) and ties (associations). Such functionality is today available in present social network analysis software like e.g. iPoint, NetMiner, InFlow or in the open source packages Social Networks Visualiser and SocNetV. The social network module 135 can here be seen as the previously mentioned social network system.

Each of the modules 131-135 can be implemented as a computer program that is stored on a computer program product 1310 comprising at least one memory (computer readable means) 1311 and a computer program (code means) 1312 executing within the computer system 130. The memory 1311 may be a ROM, RAM or flash memory or any other suitable memory or data storage media, such as a conventional hard drive, CD-ROM or DVD-ROM. It should be appreciated that even if the modules 131-135 are illustrated as if located within a computer, one or more of the modules 131-135, e.g. the social networking module 132, can be arranged within a separate (distributed), information processing system, e.g. within a server farm, where the system is configured to function as a single, unified node in a more general network perspective.

The messaging module 132 can, responsive to instructions received from one or more of the other modules of the computer system 130 and in cooperation with the interface and communications module 137, generate messages to be sent via the communication network 110. For example may electronic mail messages, instant messaging messages or text messages be generated and sent, telephone calls may be placed and so on.

The social networking module 135 stores social network information relating to one or more users or the UEs 121-123 in the communication system 100. The social network information specifies associations of users and, when specifying a relationship between two or more users 191-193, it is appreciated that a listing of the mobile node belonging to (associated with) each user can be specified such that any association between two users 191, 192 further creates an association between the mobile nodes of the users 141, 142. The social network is specified in a conventional manner, e.g. as a list of one or more users associated with a given user or as a graph where each user is depicted as a node and relationships among users are depicted as ties connecting the nodes. The social network information is stored within the social networking module 135. It is possible to both import networking data from a present networking system and to allow users of the UEs 141-142 to input their own data and hence generate a new social network.

The UE position module 134 stores in the database 139 the time-distributed locations of the UEs 141-143. In case the computer system 130 is configured to determine the time-distributed locations, the UE position module 134 also determines these locations which can be done by e.g. base station triangulation as described above. In case the equipment position module 134 receives position data from a UE using a GPS receiver, then the equipment position module 134 performs the previously described time-stamp synchronization by comparing the transmission time with the receive time.

If needed, the UE position module 134 also transforms time-distributed locations to a suitable format. For instance, the cell-IDs need to be transformed into coordinates plus an uncertainty radius. This can be done using a cell-ID database which is a database that stores the physical location of different cell-IDs. Examples on such databases are OpenCellID.org or Sony Ericsson's SercPos. The final result (received or determined) can be stored in an SQL-like database as illustrated in table 1 below.

TABLE 1

| id | latitude | Longitude | accuracy | time-stamp | user_id |
|----|----------|-----------|----------|------------|---------|
| 1  | 1621322  | 6588955   | 400 m    | 2009-01-22-13:45 | 4 |
| 2  | 1623072  | 6590393   | 600 m    | 2009-01-22-13:47 | 4 |
| 3  | 1832352  | 6423432   | 5 m      | 2009-01-22-14:12 | 5 |

Table 1 shows three time-distributed locations, where id is an identifier of the time-distributed location, latitude and longitude are the position-coordinates, accuracy is the uncertainty radius, timestamp is the time when the user was at that position and user_id is an identifier of the UE to which the time-distributed location belongs. More specifically, the accuracy is inherent to the UE-positioning method used and is a measure indicating a radius having its center at the point of the position-coordinates. The UE is located somewhere within the radius and, as can be seen, the radius may vary as different positioning techniques often have different accuracy in terms of determining the true position-coordinates. The user_id can for example be the IMEI (International Mobile Equipment Identity) of the UE, the IMSI (International Mobile Subscriber Identity) of a SIM-card in the UE, a URI (Uniform Resource Identifier) or a an IP-address associated with the UE.

The point of interest calculation module 131 uses the time-distributed locations for calculating a point of interest which can be done by using a clustering algorithm on the data such as k-means-clustering. The clustering will be performed at least in four dimensions; latitude, longitude, time and user.

The result of the clustering algorithm is a number of common points of interest and a metric describing the intensity, how many users are involved, when and for how long time the geographical area is a point of interest etc. The resulting information for each point of interest is stored separately in the database 139 for convenient future access. To find the personal points of interest a similar cluster analysis is made for the data from each user. This will help the system to discover where each user tends to stay for longer periods of time (for instance at the office or at home). These personal points of interest are used to find frequent routes for the user which can predict the user behavior, which is done by the presence prediction module 133 that can predict a location of a UE at some time in the future.

More specifically, the presence prediction module 133 is configured to determine a future heading (direction and/or a velocity at which an object travels) and location of a UE like the UE 141. A heading and location can be determined e.g. based upon a histogram like table 1 above of UE location information specifying location and time stamp information, e.g., date and/or time, for each location. The presence prediction module 133 can then calculate a probability that the UE is in route to, or will visit, a certain candidate point of interest. Such probabilities can be determined according to any of a variety of factors, and known statistical and/or data mining techniques within the art is preferably employed, such as algorithms like Apriori, GSP (Generalized Sequential Pattern) or SPADE (Sequential PAttern Discovery using Equivalent Class), or by using FreeSpan (frequent pattern-projected sequential pattern mining) or PrefixSpan (mining sequential patterns by prefix-projected growth).

Figure 4:
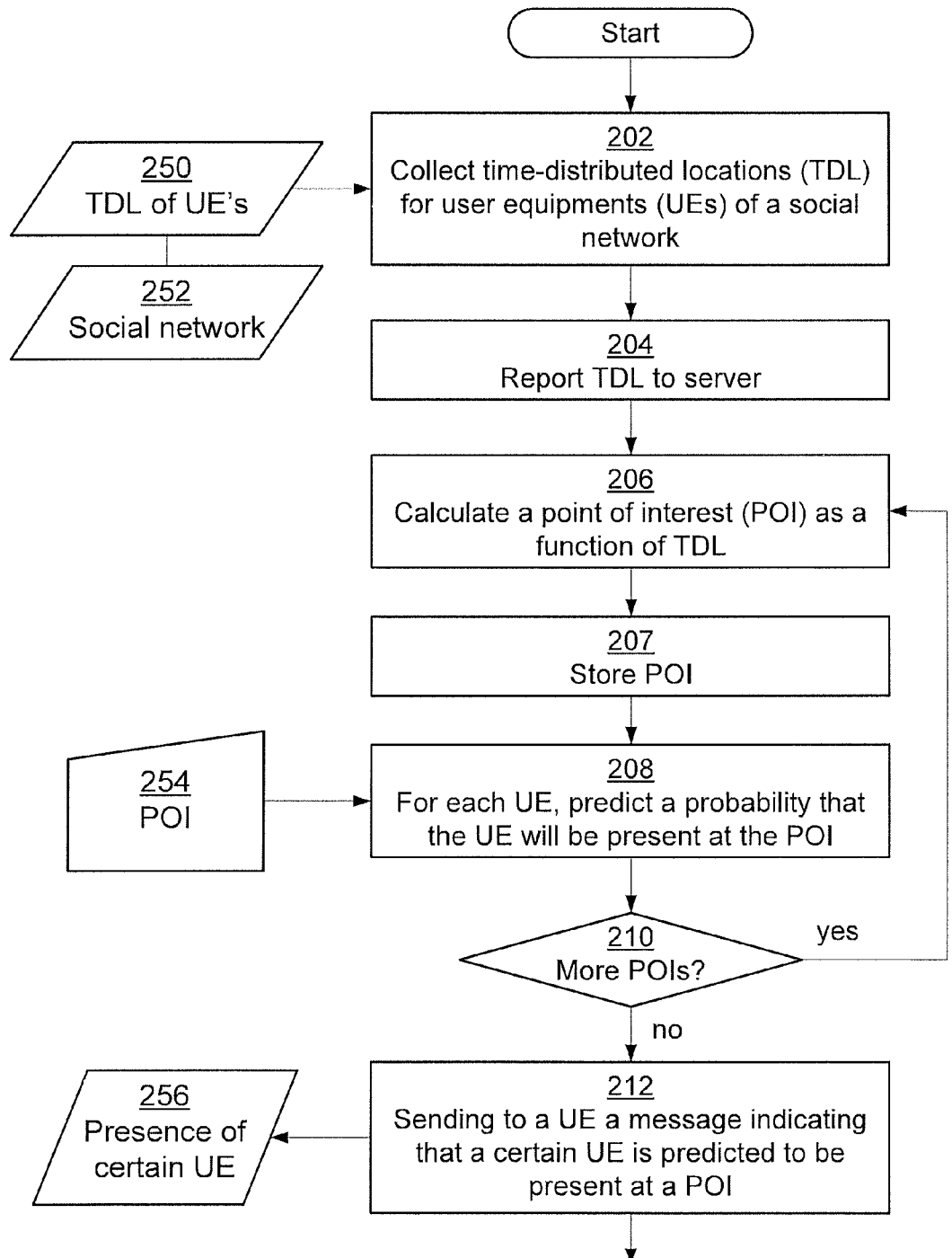
FIG. 4 is a flow diagram of an embodiment of the inventive method performed in the system of FIG. 1.

With reference to FIG. 4 a flow chart illustrating a method of predicting a presence of a UE is shown. This method can be implemented by the communication system 100 described in connection reference with FIG. 1. As such, one or more of the steps may be performed in a different order than presented in the flow chart, one or more of the steps may be optionally performed, omitted, combined and/or divided into several steps.

In the first step 202, data 250 in the form of time-distributed locations for UEs associated with each other via social networking data 252 is collected. Such collection may include both receiving of such data as well as active calculation of the data, which means that the time-distributed locations may be "determined" either by the UEs 141-142 or by the computer server 130 or by a combination thereof.

In any case, next the time-distributed locations are reported 204 to the point of interest calculation module 131 which calculates 206 a point of interest, which calculation is further illustrated below. New points of interest are regularly calculated and stored for future use, and data 254 describing a point of interest can be manually inserted by a user. Of course, earlier points of interest that do not longer fulfils the requirements (e.g. enough people visiting) for being classified as a point of interest can be removed. In respect of storing the point interest, a next step 207 of the method may store the point of interest in the database 139.

For each UE a probability that the UE will be present at any of the points of interest is predicted 208, using known statistical methods such as the Generalized Sequential Pattern method. This prediction 208 is determined 210 complete once predictions for each point of interest are finished.

Next the computer system 130 initiates 212 a message that indicates that a certain UE is predicted to be present at a point of interest at a specific, future time, i.e. output data 256 in the form of a future presence of a certain UE is generated. For generating messages and any queries, known specifications and standards can be used, such as the OMA Presence SIMPLE framework, the protocol SOAP (Simple Object Access Protocol) and/or the REST (Representational State Transfer) principles.

Figure 5A:
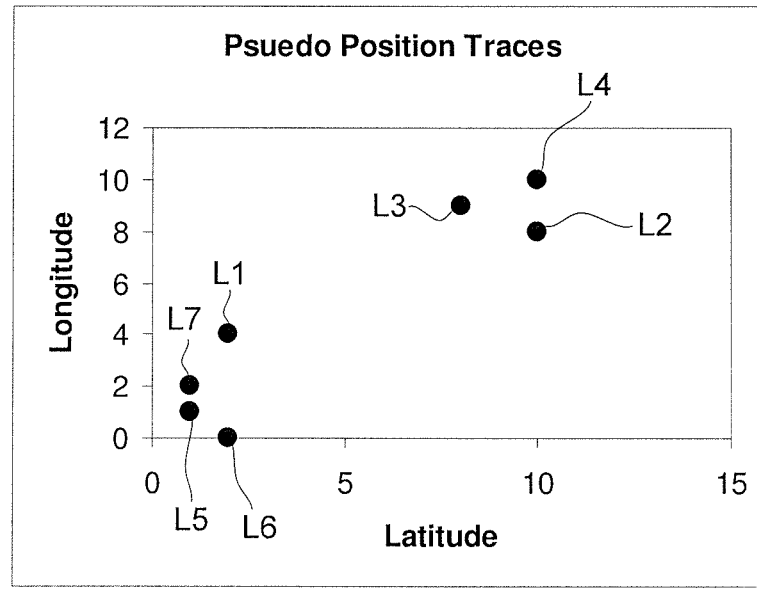
FIGS. 5a-5c illustrates data points used and/or produced by a method for determining a point of interest.
Figure 5B:
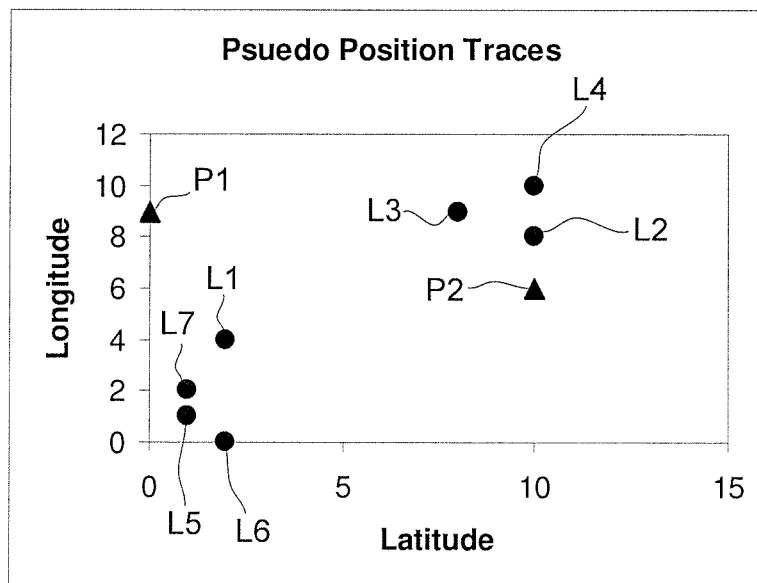
Figure 5C:
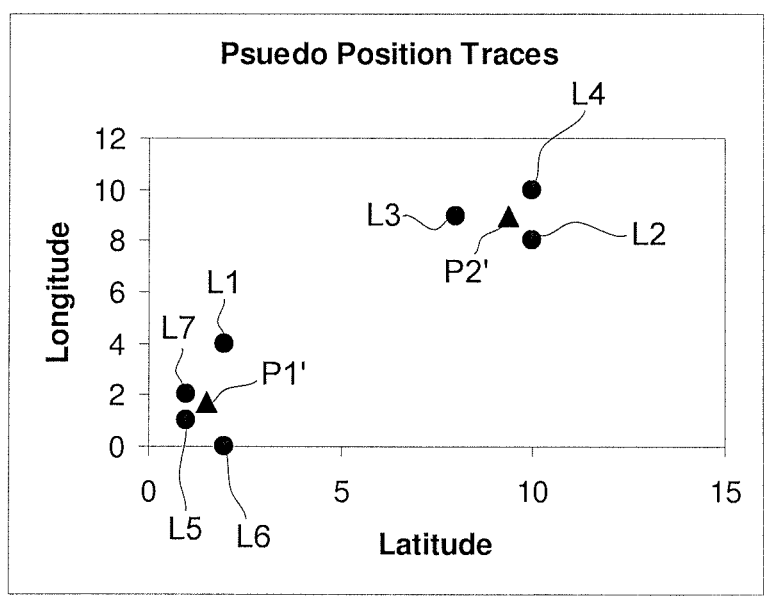

For illustrating the point of interest calculation module 131 in further detail, reference is made to FIGS. 5a-5c which supports a description of how the k-means clustering algorithm can be used to determine points of interests based on time-distributed locations. This algorithm is of course used on much bigger datasets but the principles are the same even with small amounts of data. The same algorithm can be applied both to find personal and global points of interest by using only location data from all users or using data only from one user. In the real use case there could be more dimensions than longitude and latitude as well as millions of data points.

For purpose of illustration a number of traces, or locations L1-L7, of a user (or of several users) are assumed and are shown in table 2.

TABLE 2

| t | pseudo-longitude | pseudo-latitude | reference numeral in FIGS. 5a-c |
|---|---|---|---|
| 1 | 4 | 2 | L1 |
| 2 | 8 | 10 | L2 |
| 3 | 9 | 8 | L3 |
| 4 | 10 | 10 | L4 |
| 5 | 1 | 1 | L5 |
| 6 | 0 | 2 | L6 |
| 7 | 2 | 1 | L7 |

Table 2 differs from table 1 in that the data is simpler but the same principles apply. Each row in table 2 represents one position from one a specific user. The t-column contains the index number of the row and pseudo-longitude and pseudo-latitude represent the location. This example shows the algorithm in two dimensions (longitude and latitude) but the same approach applies to n number of dimensions. Every new dimension would generate another column in the table below, and a typical further dimension is for instance time.

Plotting the values of table 2 will render a figure like FIG. 5a.

The data set containing all latitude, longitude pairs can be expressed like:

$$\chi = \{latitude^t, longitude^t\}_{t=1}^{N=7} \quad (1)$$

If there is a need to have a dynamic amount of clusters (the exact number of clusters you would like to have before the computation starts is not known) during the computation the leader cluster algorithm can be used. For the sake of simplicity this example will use a fixed number of clusters (k=2). The set of clusters ($m_i$) therefore consists of the two clusters $m_1$ and $m_2$. While this should be seen as an example, it is preferred that a combination is used to find the clusters and then the clusters can be examined in order to decide whether they are interesting as points of interest or not. E.g. are they dense enough, are they previously known etc. etc.

Before the actual computation begins the clusters need start values. These can be assigned in a number of different ways. One simple way is to just randomly assign a start value for the position of the cluster. The final result of the k-means clustering algorithm is depending on the start value of the clusters so the computations are run a number of times or a certain period of time with different start values and the results are compared. In addition to this, since the data is location data, start positions can be chosen around interesting areas to find points of interest there. The suitable number of times or period of time to run the computations depends of course on a processing capacity of the computer system, and can be empirically selected for obtaining a reasonable accuracy of the computations while taking a processing capacity of the computer system into account.

If it is assumed, which can be done randomly, that the start values for the clusters are $m_1=(0; 9)$ and $m_2=(10; 6)$, the starting condition would look like in FIG. 5b, where $m_1$ is indicated by reference numeral P1 and $m_2$ is indicated by reference numeral P2.

The next step in the k-means algorithm is to calculate for each latitude-longitude pair in X what cluster point ($m_i$) is closest. In this case two dimensions are used and the following formula is used:

$$b_i^t \begin{cases} 1, & \text{if } \sqrt{(x^t)^2 - (m_i)^2} = \min_j \sqrt{(x^t)^2 - (m_j)^2} \\ 0, & \text{otherwise} \end{cases} \quad (2)$$

This renders a calculation of which cluster point ($m_i$) each latitude-longitude pair is currently closest to, which can be visualized by adding more columns to a table 3:

TABLE 3

| T | pseudo-longitude | pseudo-latitude | $b_1$ | $b_2$ |
|---|---|---|---|---|
| 1 | 4 | 2 | 1 | 0 |
| 2 | 8 | 10 | 0 | 1 |
| 3 | 9 | 8 | 0 | 1 |
| 4 | 10 | 10 | 0 | 1 |
| 5 | 1 | 1 | 1 | 0 |
| 6 | 0 | 2 | 1 | 0 |
| 7 | 2 | 1 | 1 | 0 |

Once table 3 is created recalculation of the cluster positions in ($m_i$) is performed. This is done by using following formula:

$$m_i = \frac{\sum_t b_i^t \cdot x^t}{\sum_t b_i^t} \quad (3)$$

In present example the result will be this for $m_1$ (0; 9):

$$\text{Latitude: } m_1 = \frac{\sum_t b_1^t \cdot x^t}{\sum_t b_1^t} = \frac{x^{t=1} + x^{t=5} + x^{t=6} + x^{t=7}}{4} = \frac{6}{4} = 1,5 \quad (4)$$

$$\text{Longitude: } m_1 = \frac{\sum_t b_1^t \cdot x^t}{\sum_t b_1^t} = \frac{x^{t=1} + x^{t=5} + x^{t=6} + x^{t=7}}{4} = \frac{7}{4} = 1,75 \quad (5)$$

which results in the new $m_1$ (1,5; 1,75)

In the case of $m_2$ at (10; 6) the numbers will look like this:

$$\text{Latitude: } m_2 = \frac{\sum_t b_1^t \cdot x^t}{\sum_t b_1^t} = \frac{x^{t=2} + x^{t=3} + x^{t=4}}{3} = \frac{28}{3} = 9\frac{1}{3} \quad (6)$$

$$\text{Longitude: } m_2 = \frac{\sum_t b_1^t \cdot x^t}{\sum_t b_1^t} = \frac{x^{t=2} + x^{t=3} + x^{t=4}}{3} = \frac{27}{3} = 9 \quad (7)$$

Resulting in the new $m_2$ (9,33; 9)

When the new clusters are plotted in a graph the plot looks like look in FIG. 5c, where the new $m_1$ is indicated by reference numeral P1' and the new $m_2$ is indicated by reference numeral P2'. The points of interests 171-173 of FIG. 1 can functionally correspond to values similar to the new values of $m_1$ and $m_2$. Thus, the new values of $m_1$ and $m_2$ represent an example of how two points of interest (i.e. two aggregated locations) can be determined. Since the determinations of the new $m_1$ and $m_2$ are based on (i.e. determined as a function of) several locations (i.e. a set of locations), the point of interests can be referred to as aggregated locations. From this follows that, in this example, the set of locations are illustrated by the positions L1-L7 in FIGS. 5a-5c.

In this simple example the clusters converge very fast. However, in reality when massive amounts of data are used the procedure of estimating new cluster positions must be made several times before they converge.

As mentioned before, the starting points can be chosen around interesting areas, and when more dimensions such as time are available these can be used to pose constraints on the evaluations. It is also possible to limit the area in which to calculate points of interest due to sometimes computationally heavy operations performed.

Of course, the communication system, base stations and UEs described herein are in addition implemented according to known standards and protocols within the field of wireless communication. In fact, the invention may be implemented on present hardware equipment, as long as positions of a number of associated UEs may be identified and reported to a computer. Then it is only a matter of implementing software instructions which when run in the computer perform the above described method.

Software instructions, i.e. a computer program code for carrying out methods performed in the previously discussed system may for development convenience be written in a high-level programming language such as Java, C, and/or C++ but also in other programming languages, such as, but not limited to, interpreted languages. Some modules or routines may be written in assembly language or even microcode to enhance performance and/or memory usage. It will be further appreciated that the functionality of any or all of the functional steps of the method may also be implemented using discrete hardware components, one or more application specific integrated circuits, or a programmed digital signal processor or microcontroller.

Although various embodiments of the invention have been described and shown, the invention is not restricted thereto, but may also be embodied in other ways within the scope of the subject-matter defined in the following claims. In particular, the invention may be implemented by using other techniques for predicting a probability that a mobile UE will be present at a certain location at a future time.

The invention claimed is:

1. A method of predicting presence of a mobile user equipment, performed on a computer system and comprising the steps of:
   determining a set of time-distributed locations of a number of mutually associated mobile user equipments,
   calculating an aggregated location based on said determined set of time-distributed locations of the mutually associated mobile user equipments, wherein said aggregated location is calculated as a function of a location distribution of the set of locations,
   for each mobile user equipment, predicting a probability that the mobile user equipment will be present at the calculated aggregated location at a future time, and
   initiating sending, to any of the mobile user equipments, a message indicating that another mobile user equipment of the mobile user equipments is predicted to be present at the aggregated location at a specific future time.

2. A method according to claim 1, comprising receiving from a mobile user equipment the aggregated location.

3. A method according to claim 1, wherein the aggregated location comprises a geographical coordinate.

4. A method according to claim 1, wherein the aggregated location comprises a distance value defining an area of the aggregated location.

5. A method according to claim 4, wherein the distance value is a function of the set of time-distributed locations of the number of mobile user equipments.

6. A method according to claim 1, comprising the steps of:
   selecting a certain aggregated location as a function of the probability of mobile user equipments being present at the certain aggregated location, and
   initiating sending to a mobile user equipment information associated with the certain aggregated location.

7. A method according to claim 1, comprising the step of storing the aggregated location.

8. A method according to claim 1, wherein the step of calculating the aggregated location comprises determining a mean value of the set of locations.

9. A method according to claim 1, wherein aggregated location is a mean value of the set of locations.

10. A method according to claim 1, wherein the mobile user equipments are associated with each other via a social network system.

11. A method according to claim 1, comprising receiving at predefined time intervals time-distributed locations of a certain user equipment.

12. A method according to claim 11, wherein the predefined time intervals are determined as a function of a travelling speed of the certain user equipment.

13. A method according to claim 11, wherein the receiving of time-distributed locations comprises receiving a transmission time value set at the certain user equipment sending the time-distributed locations.

14. A method according to claim 13, comprising comparing the transmission time value with a receiving time value, for evaluating a validity of the time-distributed locations received with the transmission time value.

15. A method according to claim 1, comprising receiving from a user equipment a manual confirmation of a future presence at the aggregated location.

16. A method according to claim 1, comprising verifying an allowance setting received by a certain mobile user equipment before initiating the sending of any message indicating the predicted presence of the certain mobile user equipment.

17. A method according to claim 16, comprising omitting the initiate of the sending of any message indicating the predicted presence of the certain mobile user equipment, if the allowance setting fulfills a specific condition.

18. A computer system in a communications network for predicting presence of a mobile user equipment, the computer system comprising:
- a position module configured to determine a set of time-distributed locations of a number of mutually associated mobile user equipments,
- a calculation module configured to calculate an aggregated location based on said determined set of time-distributed locations of the mutually associated mobile user equipments, wherein said aggregated location is calculated as a function of a location distribution of the set of locations, and for each mobile user equipment, predict a probability that the mobile user equipment will be present at the calculated aggregated location at a future time, and
- a messaging module configured to send, to any of the mobile user equipments, a message indicating that another mobile user equipment of the mobile user equipments is predicted to be present at the aggregated location at a specific future time.

19. A mobile user equipment configured to exchange predicted presences with a number of associated, corresponding mobile user equipments, the mobile user equipment comprising:
- a processing unit configured to determine a set of time-distributed locations of the mobile user equipment; and
- a transceiver, wherein said transceiver is configured to:
- receive a message indicating that any of the mutually associated mobile user equipments is predicted to be present at an aggregated location at a specific future time, wherein, the aggregated location is based at least in part on the determined set of time-distributed locations of the mobile user equipment, the aggregated location being calculated as a function of a location distribution of the set of locations and a corresponding set of time-distributed locations of the number of mutually associated mobile user equipments.

20. A non-transitory computer program product for predicting presence of a mobile user equipment, comprising code—which when run on a computer system causes the computer system to:
- determine a set of time-distributed locations of a number of mutually associated mobile user equipments,
- calculate an aggregated location based on said determined set of time-distributed locations of the mutually associated mobile user equipments, wherein said aggregated location is calculated as a function of a location distribution of the set of locations,
- for each mobile user equipment, predict a probability that the mobile user equipment will be present at the calculated aggregated location at a future time, and
- initiate sending, to any of the mobile user equipments, a message indicating that another mobile user equipment of the mobile user equipments is predicted to be present at the aggregated location at a specific future time.

* * * * *

UNITED STATES PATENT AND TRADEMARK OFFICE
CERTIFICATE OF CORRECTION

PATENT NO. : 8,718,619 B2
APPLICATION NO. : 12/768951
DATED : May 6, 2014
INVENTOR(S) : Lidström et al.

Page 1 of 1

It is certified that error appears in the above-identified patent and that said Letters Patent is hereby corrected as shown below:

In the Specification

Column 6, Line 59, delete "illustrates" and insert -- illustrate --, therefor.

Column 8, Line 39, delete "and or" and insert -- and/or --, therefor.

Column 14, Line 19, delete "$(m_1)$" and insert -- $(m_i)$ --, therefor.

Column 14, Line 45, delete "$(m_1)$" and insert -- $(m_i)$ --, therefor.

Signed and Sealed this
Fourth Day of November, 2014

Michelle K. Lee
*Deputy Director of the United States Patent and Trademark Office*